UNITED STATES PATENT OFFICE.

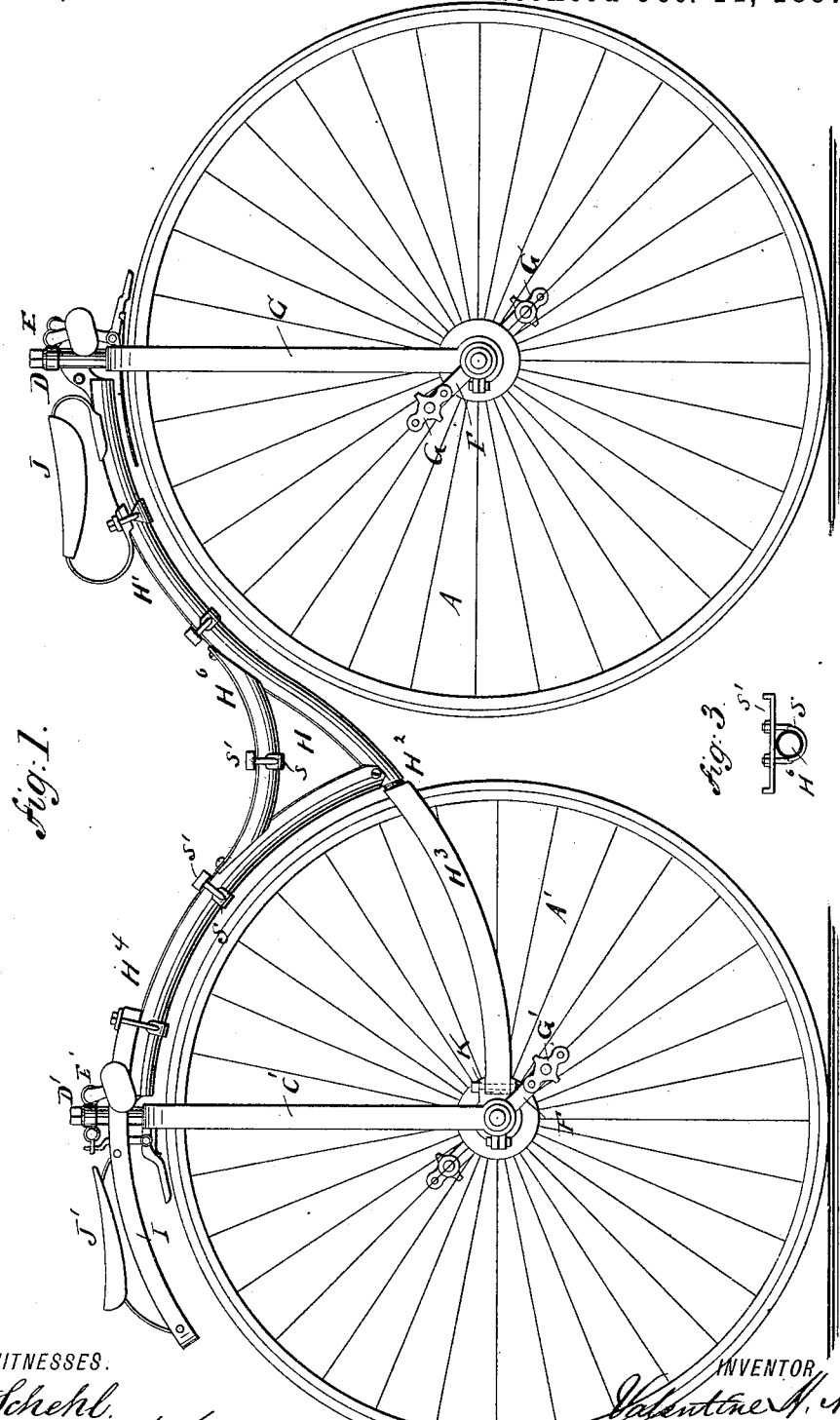

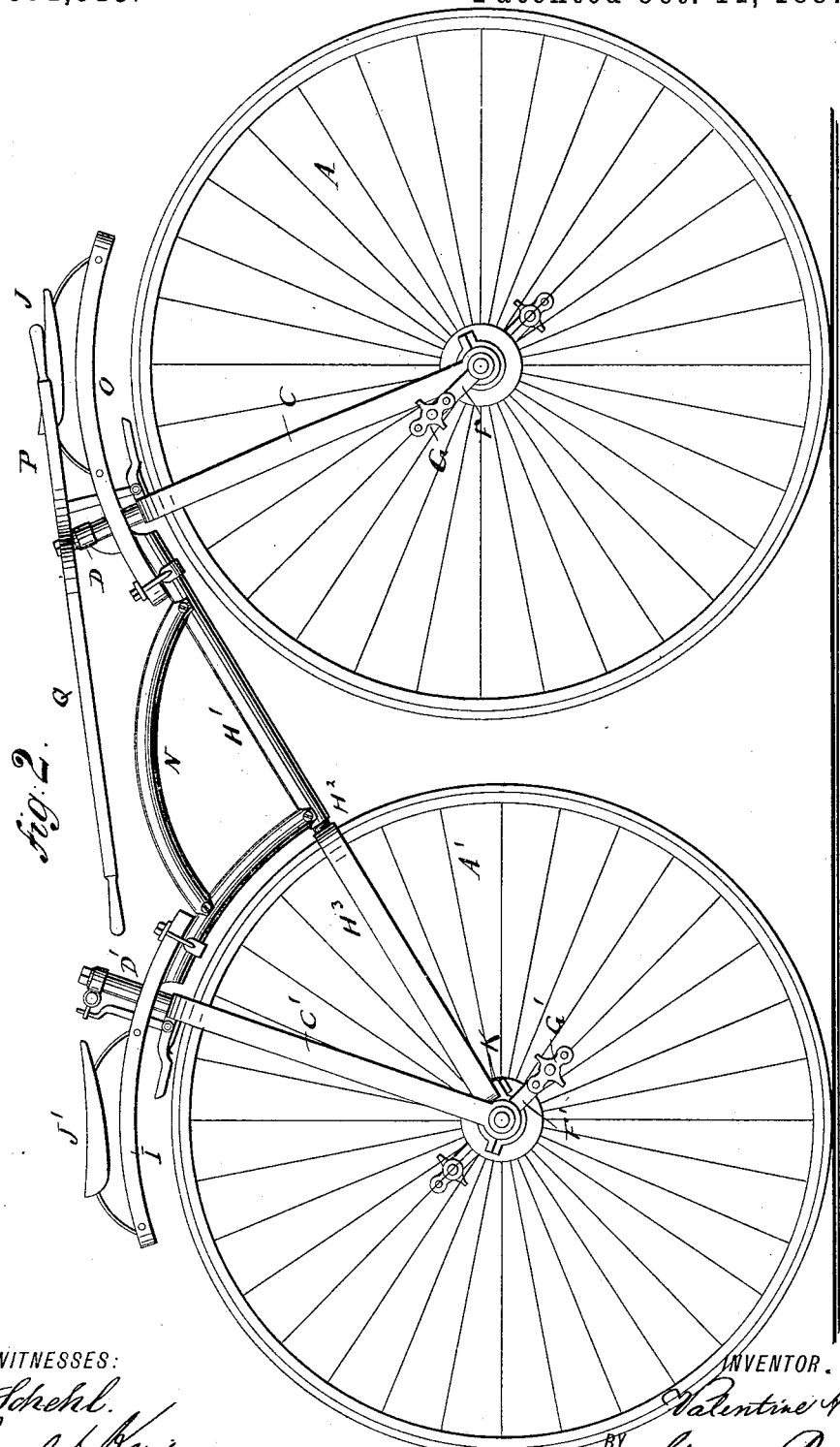

VALENTINE H. MULLER, OF NEW YORK, N. Y.

TANDEM BICYCLE.

SPECIFICATION forming part of Letters Patent No. 371,513, dated October 11, 1887.

Application filed November 23, 1886. Serial No. 219,663. (No model.)

*To all whom it may concern:*

Be it known that I, VALENTINE H. MULLER, of the city, county, and State of New York, have invented certain new and useful Improvements in Tandem Bicycles, of which the following is a specification.

Heretofore tandem tricycles have been constructed and used which were arranged for two riders, both of whom assist in propelling the machine.

The object of my invention is to provide a tandem bicycle, in which both persons riding on the same can assist in propelling, and one or both can steer.

The invention consists in the combination, with two bicycle driving-wheels, each having pedals or driving-gearing, of a frame uniting the same, all as will be fully described hereinafter, and pointed out in the claims.

In the accompanying drawings, Figure 1 is a side elevation of my improved tandem bicycle. Fig. 2 is a side view of a modified construction. Fig. 3 is a detail cross-sectional view on line $x\ x$, Fig. 1.

Similar letters of reference indicate corresponding parts.

The two bicycle driving-wheels A and B, constructed in any well-known manner, may be of the same size, or the rear wheel may be slightly smaller than the front wheel. Both wheels have their axles mounted in forks C C', respectively, said forks being provided with the usual heads, D D', to which the handle-bars E E' are fastened in the usual manner. The brakes are also provided in the usual manner. On the end of the axle of each wheel cranks F F' are fastened, the cranks being provided with the pedals G G', of any approved construction. The backbone, usually connected with the heads of the forks, is detached, and the forks of the two wheels are united by a frame, H, composed of a tube, H', curved down along the rear part of the rim of the front wheel, A, to a point slightly in front of the rim of the rear wheel, as at $H^2$, at which point $H^2$ a tube, $H^4$, is fastened to the tube H' and extends upward over the front part of the rim of the rear wheel, A', and is fastened at its upper end to the head D' of the fork C' of the rear wheel, A'. To the upper end of the tube $H^4$ an extension, I, is fastened, which projects beyond the rear of the head D', and is apertured or slotted or forked, so as to permit said head to pass through it. A front saddle, J, is fixed to the upper part of the tube H' directly behind the fork C, and the rear saddle, J', is fixed on the extension I. The lower end of the fork $H^3$ is fastened by a bolt to forks K on the lower ends of the shanks of the rear fork, C', or to rings mounted on the axle adjacent to the lower ends of said forks. One rider occupies the front saddle and the other the rear saddle, and both operate the pedals of their wheels. The front wheel can be turned freely for steering and the rear wheel trails. The curved tubes H' $H^4$ are united by the downwardly-curved tube $H^6$.

In the modification shown in Fig. 2 the tube H' is made straight and in line with the fork $H^3$. The upwardly-curved bar N is fastened to the tube H' and to the tube $H^1$. The fork C' of the rear wheel, A', is inclined forward, while the fork C of the front wheel is inclined backward. The rear seat is arranged in the manner shown in Fig. 1. The front seat is fastened in front of the front head, D, on the extension clipped on the upper end of the tube H'. The handle-bar P on the front fork, C, is curved forward to the sides of the front saddle, J, and from the handle-bar a single or double bar, Q, extends to the rear, so that it can be grasped by the rider on the rear saddle, so that both the front and rear rider assist in steering; but in this case the front wheel only is used for the purpose of steering. The brake in this case is manipulated by the rear rider only.

A luggage-carrier of any suitable construction can be provided on the machine, and in the construction shown in Fig. 1 clips S are fastened to the tubes H', $H^3$, and $H^4$, and hold bars S', upon which luggage, &c., can be placed and strapped.

The advantage of this bicycle is that there is no danger of headers, and luggage can be carried conveniently.

Having thus described my invention, I claim as new and desire to secure by Letters Patent—

1. In a tandem bicycle, the combination, with front and rear wheels, each having a separate fork, of a curved bar or tube fastened to the head of the front fork and provided at its rear end with a fork fastened to the lower part of the fork of the rear wheel, and a tube or bar extending from the top of the rear fork down to the bar connected with the front fork, substantially as shown and described.

2. In a tandem bicycle, the combination, with front and rear driving-wheels, each having a fork, of a curved tube or bar fastened to the head of the front fork and provided in its rear end with a fork fastened to the lower end of the fork of the rear driving-wheel, a curved bar fastened to the upper end of the rear fork and having its lower end fastened to the bar or tube connected with the front fork, and a curved bar or tube connected to the tube fastened to the front fork, and the bar or tube fastened to the rear fork, substantially as shown and described.

3. In a tandem bicycle, the combination, with front and rear driving-wheels, of a fork on each wheel, a frame fastened to the head of the fork on the front wheel and to the lower ends of the fork on the rear wheel, a curved bar extending from said frame up to the head of the fork on the rear wheel and provided with an extension beyond the head of the rear fork, which extension carries a saddle, substantially as shown and described.

4. In a tandem bicycle, the combination, with the front and rear wheels, of a frame uniting them, and forked pieces on the axle of the rear wheel for the purpose of connecting part of the frame with the lower part of the fork of the rear wheel, substantially as shown and described.

In testimony that I claim the foregoing as my invention I have signed my name in presence of two subscribing witnesses.

VALENTINE H. MULLER.

Witnesses:
OSCAR F. GUNZ,
SIDNEY MANN.